(No Model.)
C. RICHARDSON.
SAW.
No. 315,663.  Patented Apr. 14, 1885.
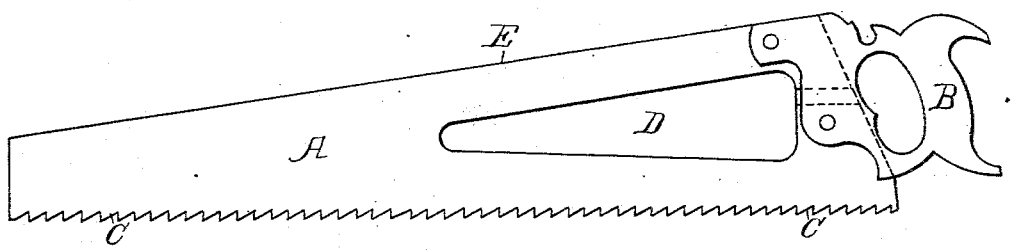
Attest.
L. Lee
Henry J. Theberath
Inventor.
Christopher Richardson,
per Crane & Miller, Attys.

United States Patent Office.

CHRISTOPHER RICHARDSON, OF NEWARK, NEW JERSEY.

SAW.

SPECIFICATION forming part of Letters Patent No. 315,663, dated April 14, 1885.

Application filed February 4, 1885. (No model.)

*To all whom it may concern:*

Be it known that I, CHRISTOPHER RICHARDSON, a citizen of the United States, residing in Newark, Essex county, New Jersey, have invented certain new and useful Improvements in Saws, fully described and represented in the following specification and the accompanying drawing, forming a part of the same.

This invention consists in the combination, with a handsaw-blade, of a three-sided opening extended from the handle toward the middle of the blade.

The invention will be understood by reference to the annexed drawing, which represents a handsaw provided with a nearly triangular aperture formed in the blade adjacent to the handle, and extending along the body of the blade nearly parallel with the back and front edges.

A is the saw-blade; B, the handle; C, the toothed edge of the saw; D, the opening through the blade, and E the back or rear edge of the blade. The edge of the aperture next the saw-teeth is shown nearly parallel with the cutting-edge in the figure; but, in order to compensate for the wear and resharpening of the blade about the middle of its length, the front side of the aperture in the figure is sloped inward toward the center of the blade, so as to gradually increase the width of the metal behind the cutting-edge C at the middle of the length of the saw where the wear is greatest. As a matter of fact, the wear on different parts of the saw is in the same proportion as the distance of the teeth from the butt, so that an old saw which has been many times resharpened is generally very much reduced in width at the point, while the butt may be of the original width. It is therefore obvious that by forming the aperture D nearest to the butt of the saw, and sloping its front side inward toward the center of the blade, I do not interfere in any manner with the resharpening of the saw, or induce any objectionable weakening of the toothed edge C by the normal wear of the same. It would seem that the formation of such an aperture in the saw-blade would greatly diminish its strength, and thus lessen its utility and durability; but I have found that the diminished contact of the saw-plate with the wood so greatly reduces the friction that the saw does not require the usual degree of force to propel it, and that its strength is greater in proportion to its work than that of a solid saw-blade, while the teeth also require much less set than usual. This latter feature is a great advantage in every class of saws, as it makes the saw cut much smoother, and as any saw that could be used for very close joints in carpentry must necessarily have very little "set" in the teeth, my invention fills a long-felt want in this respect, and obviates the use in many cases of wedges driven into the saw-kerf when using the saw, or to free the saw-blade when stuck in the kerf.

It is well known that handsaws are often bent by hand-pressure when sticking in the saw-kerf, and that they often become permanently crooked by repeated bending in such manner, and by subsequent attempts to straighten them.

Handsaws constructed with my improvement pass through the wood so freely that such bending does not occur, and this arises not only from the diminished blade-surface in contact with the wood, but from the more perfect discharge of the cuttings from the saw-kerf, the sawdust naturally working into the aperture as the saw penetrates the kerf, and being carried gradually out of the kerf by the alternate projection of the ends of the aperture beyond the same.

My improvement is also of great value at two points in the process of manufacture, by reason of the more perfect yielding of the saw-plate when pressed or hammered.

It is now customary to temper saws by pressure between heated iron plates, and I find that the tempering is much more quickly done and the saw received from the press in a much flatter and straighter condition, and with the use of much less pressure, by reason of the apertures in the saw-blades and the facility they afford for the metal to yield.

In the process of hammering to finally straighten the saws I also find a very great saving in the time, skill, and labor required to straighten a saw with such apertures, as the metal yields under much lighter blows, and may be readily stretched in the lines parallel with the sides of the apertures.

For easing the saw in its passage through the wood it is preferable that one edge of the aperture should be nearly parallel with the line of the saw-teeth; but it is obvious that the advantages of the invention may be secured by making the front edge of the aperture D substantially parallel with the line of the saw-teeth, but varied from such line sufficiently to widen the toothed edge C just where it wears the most—at the middle of its length.

I am aware that openings and also slots extended to the edge of the saw-blade have been used heretofore, and do not therefore claim an opening as new in itself, nor the use of a slot to relieve the expansion of a saw-blade when heated by use.

Although I disclaim as not of my invention a slot extended to the edge of a saw-blade, I may use the same in combination with the aperture D, and have shown such a modification in the figure. The handsaw in the figure is shown formed with a slot, I, extending from the aperture D through the wide end of the blade inside of the handle. The metal at each side of the slot thus forms a separate tongue, G, which is independently secured to the handle B by screws or rivets s. The slot I does not affect the operation of the aperture D in practice, and the latter, in its relation to the action of the teeth when cutting, is therefore the essential part of my invention.

I am aware that openings substantially parallel with the cutting-edge have been formed in circular saws, both in radial lines and in a triangular form, and that such openings would effect the same results in the process of manufacture as the opening D shown herein; but the action of the openings when the saw is in use is materially different with a handsaw, on account of the reciprocating movement of the latter, which movement serves to detach the sawdust from the sides of the saw-kerf by the alternate scraping of the ends and sides of the slot against the grain of the wood, and to discharge the sawdust inclosed in the opening at each stroke of the blade, when the opening would necessarily be drawn out of the kerf on the back-stroke. I therefore wholly disclaim an opening in a circular saw, and having pointed out the operation of the same in using a handsaw, I restrict my invention exclusively thereto.

Having thus described my invention, what I claim herein is—

1. The combination, with the handsaw-blade A, having handle B attached thereto at the end, of the three-sided opening D, formed with its wider end at the butt of the saw and tapering toward the middle of the blade, as and for the purpose set forth.

2. The combination, with the tapering handsaw-blade A, of the aperture D, having one side thereof substantially parallel with the line of the teeth, and having the slot I, connecting the aperture with the wide end of the saw, and the metal at each side of said slot independently attached to the handle, substantially as shown and described.

In testimony whereof I have hereunto set my hand in the presence of two subscribing witnesses.

CHRISTOPHER RICHARDSON.

Witnesses:
 THOS. S. CRANE,
 L. LEE.